United States Patent
Steinmetz et al.

(10) Patent No.: US 9,630,211 B2
(45) Date of Patent: Apr. 25, 2017

(54) METHOD FOR PRODUCING A MULTICOAT COLOR AND/OR EFFECT PAINT SYSTEM

(71) Applicant: BASF Coatings GmbH, Münster (DE)

(72) Inventors: Bernhard Steinmetz, Rütschenhausen (DE); Michael Matura, Kitzingen (DE); Matthias Schad, Würzburg (DE)

(73) Assignee: BASF Coatings GmbH, Münster (DE)

( * ) Notice: Subject to any disclaimer, the term of this patent is extended or adjusted under 35 U.S.C. 154(b) by 151 days.

(21) Appl. No.: 14/382,024

(22) PCT Filed: Mar. 1, 2013

(86) PCT No.: PCT/EP2013/054199
§ 371 (c)(1),
(2) Date: Aug. 29, 2014

(87) PCT Pub. No.: WO2013/128011
PCT Pub. Date: Sep. 6, 2013

(65) Prior Publication Data
US 2015/0030776 A1    Jan. 29, 2015

Related U.S. Application Data

(60) Provisional application No. 61/605,800, filed on Mar. 2, 2012.

(30) Foreign Application Priority Data

Mar. 2, 2012 (EP) .................................. 12157952

(51) Int. Cl.
| | | |
|---|---|---|
| B05D 7/00 | (2006.01) | |
| C09D 5/36 | (2006.01) | |
| C09D 7/00 | (2006.01) | |
| C08L 61/28 | (2006.01) | |
| C08L 67/00 | (2006.01) | |
| C08L 75/04 | (2006.01) | |
| C09D 5/00 | (2006.01) | |
| C09D 175/16 | (2006.01) | |
| B05D 5/06 | (2006.01) | |
| C09D 133/14 | (2006.01) | |

(52) U.S. Cl.
CPC .............. B05D 7/532 (2013.01); B05D 5/06 (2013.01); C08L 61/28 (2013.01); C08L 67/00 (2013.01); C08L 75/04 (2013.01); C09D 5/002 (2013.01); C09D 5/36 (2013.01); C09D 7/001 (2013.01); C09D 133/14 (2013.01); C09D 175/16 (2013.01)

(58) Field of Classification Search
CPC .......... B05D 7/532; C09D 5/36; C09D 7/001; C08L 61/28; C08L 75/04; C08L 67/00
USPC .............................. 524/765; 427/385.5, 407.1
See application file for complete search history.

(56) References Cited

U.S. PATENT DOCUMENTS

| | | | |
|---|---|---|---|
| 3,331,801 A | 7/1967 | Osmond et al. | |
| 4,914,148 A | 4/1990 | Hilla et al. | |
| 5,334,420 A | 8/1994 | Hartung et al. | |
| 5,368,944 A | 11/1994 | Hartung et al. | |
| 5,658,617 A | 8/1997 | Gobel et al. | |
| 5,663,265 A * | 9/1997 | Epple .................. | C08F 8/30 526/308 |
| 6,583,214 B1 | 6/2003 | Haeberle et al. | |
| 6,632,915 B1 | 10/2003 | Schwarte et al. | |
| 6,737,468 B1 | 5/2004 | Bremser | |
| 8,211,504 B2 | 7/2012 | Wegner et al. | |
| 2004/0139887 A1* | 7/2004 | Zhang .................. | C09D 5/002 106/287.11 |
| 2008/0060552 A1* | 3/2008 | Yong .................... | B05D 7/54 106/287.35 |

(Continued)

FOREIGN PATENT DOCUMENTS

| | | |
|---|---|---|
| DE | 1519197 | 10/1970 |
| DE | 4009858 | 10/1991 |
| DE | 4010176 | 10/1991 |

(Continued)

OTHER PUBLICATIONS

PCT International Preliminary Report on Patentability in PCT/EP2013/054199, mailed Sep. 12, 2014, 5 pages.

(Continued)

Primary Examiner — William Phillip Fletcher, III
(74) Attorney, Agent, or Firm — Servilla Whitney LLC

(57) ABSTRACT

Described is a method for producing a multicoat color and/or effect paint system by (1) applying to a substrate a pigmented aqueous basecoat material, (2) forming a polymer film from the coating material applied in stage (1), (3) applying a clearcoat material to the resultant polymer film, and then (4) curing the polymer film together with the clearcoat film. The pigmented aqueous basecoat material comprises at least one alcohol having a structure:

$$\text{(structure with R group and OH)}$$

wherein R is a $C_1$ to $C_4$ alkyl radical, with the proviso that R is not an n-butyl radical. The at least one alcohol is used in an amount of 0.1% to 5% by weight, based on the total weight of the aqueous basecoat material. Additionally, described are the corresponding coating materials and also the use of the alcohols in pigmented aqueous coating materials.

9 Claims, No Drawings

(56) References Cited

U.S. PATENT DOCUMENTS

2013/0202806 A1    8/2013   Steinmetz

FOREIGN PATENT DOCUMENTS

| | | |
|---|---|---|
| DE | 19914896 | 10/2000 |
| DE | 19930665 | 1/2001 |
| DE | 19948004 | 7/2001 |
| DE | 10043405 | 6/2002 |
| DE | 102010025769 | 1/2012 |
| EP | 0228003 | 7/1987 |
| EP | 0634431 | 1/1995 |
| WO | WO-92/15405 | 9/1992 |

OTHER PUBLICATIONS

PCT International Search Report in PCT/EP2013/054199, mailed Jun. 6, 2013, 2 pages.

* cited by examiner

METHOD FOR PRODUCING A MULTICOAT COLOR AND/OR EFFECT PAINT SYSTEM

CROSS-REFERENCE TO RELATED APPLICATIONS

This application is the National Stage entry of PCT/EP2013/054199, filed on Mar. 1, 2013, which claims priority to European Application Number 12157952.8, filed on Mar. 2, 2012, and U.S. Provisional Application Ser. No. 61/605,800 filed on Mar. 2, 2012, which are incorporated herein by reference in their entireties.

TECHNICAL FIELD

The invention relates to a method for producing a multicoat color and/or effect paint system by (1) applying to a substrate a pigmented aqueous basecoat material, (2) forming a polymer film from the coating material applied in stage (1), (3) applying a clearcoat material to the resultant basecoat polymer film, and then (4) curing the basecoat polymer film together with the clearcoat film.

The invention further relates to pigmented aqueous basecoat materials which are suitable for producing multicoat color and/or effect paint systems.

BACKGROUND

The method described above is known (compare, for example, German patent application DE 199 48 004 A1, page 17, line 37, to page 19, line 22, or German patent DE 100 43 405 C1, column 3, paragraph [0018], and column 8, paragraph [0052], to column 9, paragraph [0057], in conjunction with column 6, paragraph [0039], to column 8, paragraph [0050]) and is widely used, for example, not only for OEM (original) finishing but also for refinish on automobile bodies.

The so-called basecoat/clearcoat method in question is used in a wet-on-wet process to produce multicoat color and/or effect paint systems. In these paint systems, visible pinholes occur frequently as very small holes in the clearcoat and basecoat films.

DETAILED DESCRIPTION

Provided is a method with which multicoat color and/or effect paint systems are obtainable which are improved relative to the paint systems of the prior art. The paint systems are intended more particularly to exhibit no pinholes or only very few, and/or to exhibit an increased pinholing limit. The pinholing limit is the dry film thickness of the basecoat film above which pinholes occur.

This object is, surprisingly, achieved by the use in stage (1) of the above-described basecoat/clearcoat process of a pigmented aqueous basecoat material which comprises at least one alcohol which is characterized by the following structure:

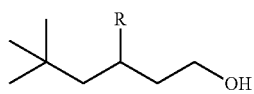

wherein R is a $C_1$ to $C_4$ alkyl radical but not an n-butyl radical. The alcohols described are used in an amount of 0.1% to 5% by weight, based on the total weight of the aqueous basecoat material applied in stage (1).

The invention relates as well to the above-described pigmented aqueous coat materials which can be used in stage (1) of the basecoat/clearcoat process.

In stage (1) of the method of the invention it is possible in principle to use all known aqueous basecoat materials if they include at least one of the above-defined alcohols in an amount of 0.1% to 5% by weight, based on the total weight of the aqueous basecoat material. Basecoat materials are termed "aqueous" when they contain 30% to 70% by weight of water, based on the total weight of the basecoat material. The terms "aqueous basecoat material" and "waterborne basecoat materials" are used as synonymous terms in this specification.

The basecoat materials used in accordance with the invention comprise color and/or effect pigments. Color pigments and effect pigments of these kinds are known to the skilled person and are described in, for example, Rompp-Lexikon Lacke and Druckfarben, Georg Thieme Verlag, Stuttgart, N.Y., 1998, page 176 and 451. The fraction of the pigments may be situated, for example, in the range from 1% to 40%, particularly 2% to 20%, more particularl5% to 15%, by weight, based on the total weight of the pigmented aqueous basecoat material.

In one or more embodiments, to the method of the invention basecoat materials which as binders comprise binders curable physically, thermally or both thermally and with actinic radiation are used.

The term "(meth)acrylate" is intended below to denote both acrylate and methacrylate. In other words, a corresponding polymer is therefore composed both of copolymerized acrylate monomers and of methacrylate monomers. However, it may also be composed exclusively of acrylate monomers or exclusively of methacrylate monomers.

In one or more embodiments, a binder present is at least one saturated or unsaturated polyurethane resin. Coating materials of this kind that comprise polyurethane resin may likewise be cured typically physically, thermally or both thermally and with actinic radiation.

In the context of the present invention, the term "physical curing" denotes the formation of a film by loss of solvent from polymer solutions or polymer dispersions. Normally no crosslinking agents are needed for such curing.

In the context of the present invention the term "thermal curing" denotes the heat-initiated crosslinking of a coating film, for which, in the parent coating material, either a separate crosslinking agent is employed, or else self-crosslinking binders are employed. The crosslinking agent comprises reactive functional groups which are complementary to the reactive functional groups present in the binders. This is typically referred to by those in the art as external crosslinking. Where the complementary reactive functional groups or autoreactive functional groups—i.e., groups which react with groups of the same kind—are already present in the binder molecules, the binders present are self-crosslinking. Examples of suitable complementary reactive functional groups and autoreactive functional groups are known from German patent application DE 199 30 665 A1, page 7, line 28, to page 9, line 24.

In the context of the present invention, actinic radiation means electromagnetic radiation such as near-infrared (NIR), UV radiation, more particularly UV radiation, and also particulate radiation such as electron beams. Curing by UV radiation is typically initiated by free-radical or cationic photoinitiators.

Where thermal curing and curing with actinic light are employed jointly, the term "dual cure" is also used.

In one or more embodiments, in the present invention, basecoat materials are those which are curable thermally or both thermally and with actinic radiation, i.e., by means of "dual cure". In specific embodiments, basecoat materials which as binder comprise a polyurethane resin and as crosslinking agent comprise an amino resin or a blocked or nonblocked polyisocyanate, particularly an amino resin are used. Among the amino resins, melamine resins are more particularly preferred.

In one or more embodiments, the polyurethane resin may be hydrophilically stabilized nonionically and/or ionically. In specific embodiments of the present invention, the polyurethane resin is hydrophilically stabilized ionically. In one or more embodiments, the polyurethane resins are linear or contain branching points. With particular preference it is a polyurethane resin connected with olefinically unsaturated monomers. Olefinically unsaturated monomers attached to the polyurethane resin (A) are preferably acrylate- and/or methacrylate-group containing monomers, thus forming polyurethane (meth)acrylates. With very particular preference the polyurethane resin is a polyurethane (meth)acrylate. In one or more embodiments, the polyurethane resin is curable physically, thermally or both thermally and with actinic radiation. More particularly it is curable thermally or both thermally and with actinic radiation. With particular preference the polyurethane resin comprises reactive functional groups by means of which external crosslinking is possible.

Suitable saturated or unsaturated polyurethane resins are described, for example, in
   German patent application DE 199 14 896 A1, column 1, lines 29 to 49 and column 4, line 23 to column 11, line 5,
   German patent application DE 199 48 004 A1, page 4, line 19, to page 13, line 48,
   European patent application EP 0 228 003 A1, page 3, line 24, to page 5, line 40,
   European patent application EP 0 634 431 A1, page 3, line 38, to page 8, line 9, or international patent application WO 92/15405, page 2, line 35, to page 10, line 32.

In one or more embodiments, for preparing the polyurethane resin aliphatic, cycloaliphatic, aliphatic-cycloaliphatic, aromatic, aliphatic-aromatic and/or cycloaliphatic-aromatic polyisocyanates which are known to the skilled person are used.

In one or more embodiments, used as alcohol component for preparing the polyurethane resins are the saturated and unsaturated polyols of relatively high molecular mass and of low molecular mass, and also, optionally, monoalcohols in minor amounts, that are known to the skilled person. Low molecular mass polyols used are, in particular, diols and, in minor amounts, triols, for introducing branching. Examples of suitable polyols of relatively high molecular mass are saturated or olefinically unsaturated polyester polyols and/or polyether polyols. As polyols of relatively high molecular mass, use is made in particular of polyester polyols, more particularly those having a number-average molecular weight of 400 to 5000 g/mol (measured by means of gel permeation chromatography against a polystyrene standard; tetrahydrofuran is employed as eluent).

In one or more embodiments, for the hydrophilic stabilization or for increasing the dispersibility in aqueous medium, the polyurethane resin may contain certain ionic groups and/or groups which can be converted into ionic groups (potentially ionic groups). Polyurethane resins of this kind are referred to in the context of the present invention as ionically hydrophilically stabilized polyurethane resins. Likewise present may be nonionic hydrophilically modifying groups. Preference, however, is given to the ionically hydrophilically stabilized polyurethanes. To be more precise, the modifying groups are alternatively
   functional groups which can be converted by neutralizing agents and/or quaternizing agents into cations, and/or cationic groups (cationic modification) or
   functional groups which can be converted by neutralizing agents into anions, and/or anionic groups (anionic modification) and/or
   nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted by neutralizing agents and/or quaternizing agents into cationic groups). Mention may additionally be made of the cationic groups prepared from the aforementioned functional groups using neutralizing agents and/or quaternizing agents known to the skilled person, such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are known to include, for example, carboxylic, sulfonic and/or phosphonic acid groups, more particularly carboxylic acid groups (functional groups which can be converted by neutralizing agents into anionic groups), and also anionic groups that are prepared from the aforementioned functional groups using neutralizing agents known to the skilled person, such as carboxylate, sulfonate and/or phosphonate groups.

In one or more embodiments, the functional groups for nonionic hydrophilic modification are poly(oxyalkylene) groups, more particularly poly(oxyethylene) groups.

The ionically hydrophilic modifications may be introduced into the polyurethane resin by monomers which contain the (potentially) ionic groups. The nonionic modifications are introduced, for example, through the incorporation of poly(ethylene) oxide polymers as lateral or terminal groups of the polyurethane molecules. The hydrophilic modifications are introduced, for example, via compounds which contain at least one group reactive toward isocyanate groups, particularly at least one hydroxyl group. For introducing the ionic modification it is possible to use monomers which as well as the modifying groups contain at least one hydroxyl group. In one or more embodiments, for introducing the nonionic modifications, the alkoxypoly(oxyalkylene) alcohols and/or polyether diols that are known to the skilled person are used.

In one or more embodiments, the polyurethane resin may be a graft polymer. More particularly it is a polyurethane resin grafted by means of olefinically unsaturated compounds, preferably olefinically unsaturated monomers. In this case, therefore, the polyurethane is grafted, for example, with side groups and/or side chains which are based on olefinically unsaturated monomers. More particularly the moieties in question are side chains based on poly(meth)acrylates. Poly(meth)acrylates for the purposes of the present invention are polymers or polymeric radicals which comprise acrylate and/or methacrylate group-containing monomers, preferably being composed of acrylate and/or methacrylate group-containing monomers. By side chains based on poly(meth)acrylates are meant side chains which are constructed in the course of the graft polymerization using (meth)acrylate group-containing monomers. In one or more embodiments, in the graft polymerization here, more than 50 mol %, more particularly more than 75 mol %, more particularly 100 mol %, based on the total amount of the monomers used in the graft polymerization, of (meth)acrylate group-containing monomers are used.

In one or more embodiments, the side chains described are introduced into the polymer after the preparation of a primary polyurethane resin dispersion. In this case, the polyurethane resin present in the primary dispersion may contain lateral and/or terminal olefinically unsaturated groups via which the graft polymerization with the olefinically unsaturated compounds then proceeds. The polyurethane resin for grafting, therefore, may be an unsaturated polyurethane resin (A). The graft polymerization then constitutes a free-radical polymerization of olefinically unsaturated reactants. It is also possible, for example, for the olefinically unsaturated compounds used for the graft polymerization to contain at least one hydroxyl group. In that case there may also initially be attachment of the olefinically unsaturated compounds via these hydroxyl groups by reaction with free isocyanate groups of the polyurethane resin. This attachment takes place instead of or in addition to the free-radical reaction of the olefinically unsaturated compounds with any present lateral and/or terminal olefinically unsaturated groups of the polyurethane resin. There then follows, again, the graft polymerization via free-radical polymerization as described earlier on above. At any rate, polyurethane resins grafted with olefinically unsaturated compounds, particularly olefinically unsaturated monomers, are obtained.

In one or more embodiments, as olefinically unsaturated compounds with which the polyurethane resin (A) is grafted it is possible to use virtually all free-radically polymerizable, olefinically unsaturated, and organic monomers which are available for these purposes to the skilled person. A number of preferred monomer classes may be cited by way of example:
  hydroxyalkyl esters of (meth)acrylic acid or of other alpha,beta-ethylenically unsaturated carboxylic acids,
  alkyl and/or cycloalkyl esters of (meth)acrylic acid having up to 20 carbon atoms in the alkyl radical,
  ethylenically unsaturated monomers containing at least one acid group, more particularly just one carboxyl group, such as (meth)acrylic acid, for example,
  vinyl esters of alpha-branched monocarboxylic acids having 5 to 18 carbon atoms,
  reaction products of (meth)acrylic acid with the glycidyl ester of an alpha-branched monocarboxylic acid having 5 to 18 carbon atoms,
  other ethylenically unsaturated monomers such as olefins (for example ethylene), (meth)acrylamides, vinylaromatic hydrocarbons (for example, styrene), vinyl compounds such as vinyl chloride and/or vinyl ethers, such as ethyl vinyl ether.

In one or more embodiments, monomers containing (meth)acrylate groups, and so the grafted-on side chains are poly(meth)acrylate-based side chains are used.

The lateral and/or terminal olefinically unsaturated groups in the polyurethane resin, via which the graft polymerization with the olefinically unsaturated compounds is able to proceed, are preferably introduced into the polyurethane resin via particular monomers. These particular monomers comprise not only an olefinically unsaturated group but also, for example, at least one group reactive toward isocyanate groups. Preference is given to hydroxyl groups and also primary and secondary amino groups. Hydroxyl groups are especially preferred.

Naturally, the monomers described through which the lateral and/or terminal olefinically unsaturated groups may be introduced into the polyurethane resin may also be employed without the polyurethane resin thereafter being additionally grafted with olefinically unsaturated compounds. In one or more specific embodiments, the polyurethane resin is grafted with olefinically unsaturated compounds.

In one or more embodiments, the polyurethane resin may be a self-crosslinking and/or externally crosslinking binder. The polyurethane resin comprises reactive functional groups through which external crosslinking is possible. In this case, the pigmented aqueous basecoat material comprises at least one crosslinking agent. More particularly, the reactive functional groups through which external crosslinking is possible are hydroxyl groups. For the purposes of the method of the invention it is possible with particular advantage to use polyhydroxy-functional polyurethane resins. This means that the polyurethane resin contains on average more than one hydroxyl group per molecule.

The polyurethane resin is prepared by the typical methods of polymer chemistry. This means, for example, the polymerization of polyisocyanates and polyols to polyurethanes, and the graft polymerization that then follows with olefinically unsaturated compounds. These techniques are known to the skilled person and may be adapted individually. Exemplary preparation processes and reaction conditions are found in European patent EP 0 521 928 B1, page 2, line 57 to page 8, line 16.

If the basecoat materials used are self-crosslinking systems, the amount of polyurethane resin is 50% to 100% by weight, particularly 50% to 90% by weight, and more particularly 50% to 80% by weight, based on the film-forming solids of the basecoat material.

By film-forming solids is meant the nonvolatile weight fraction of the basecoat material, excluding pigments and any fillers. The film-forming solids can be determined as follows: A sample of the pigmented aqueous basecoat material (approximately 1 g) is admixed with 50 to 100 times the amount of tetrahydrofuran and then stirred for about 10 minutes. The insoluble pigments and any fillers are then removed by filtration, and the residue is rinsed with a little THF, after which the THF is removed from the resultant filtrate on a rotary evaporator. The filtrate residue is dried at 120° C. for two hours and the film-forming solids that results in this drying operation is weighed.

In the case of externally crosslinking systems, the polyurethane resin content is between 10% and 80%, particularly between 15% and 75%, and more particularly between 20 and 70%, by weight, based in each case on the film-forming solids of the basecoat material.

In one or more embodiments, the polyurethane resin possesses a number-average molecular weight of 200 to 30 000 g/mol, particularly of 2000 to 20 000 g/mol (measured by means of gel permeation chromatography against a polystyrene standard; tetrahydrofuran is employed as eluent). It additionally possesses, for example, a hydroxyl number of 0 to 250 mg KOH/g, but more particularly of 20 to 150 mg KOH/g. In one or more embodiments, the acid number of the polyurethane resin is 5 to 200 mg KOH/g, more particularly 10 to 40 mg KOH/g. The hydroxyl number is determined in accordance with DIN/ISO 4629, the acid number in accordance with DIN 53402.

It is essential to the invention that the aqueous basecoat material as used in stage (1) of the method of the invention comprise at least one alcohol which is characterized by the following structure:

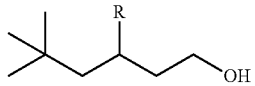

where R is a $C_1$ to $C_4$ alkyl radical but not an n-butyl radical. The at least one alcohol is used here in an amount of 0.1% to 5% by weight, particularly 0.1% to 4.5% by weight, and very particularly 0.2% to 4% by weight, based on the total weight of the aqueous basecoat material applied in stage (1). It is possible here to use one of the aforementioned alcohols or a mixture of the aforementioned alcohols.

If the amount of the substituted alcohols used in accordance with the invention or of a mixture of the alcohols used in accordance with the invention is below 0.1% by weight, the problem addressed by the invention is not solved. Where the amount is more than 5% by weight, disadvantages occur, such as a deterioration in adhesion in the case of underbaked systems, for example.

In one or more embodiments, R is selected from the group of methyl, ethyl, n-propyl, isopropyl, and isobutyl. R may also be tert-butyl. In specific embodiments, R is a methyl radical.

In very specific embodiments, R is a $C_1$ to $C_3$ alkyl radical, more particularly a $C_1$ to $C_2$ alkyl radical.

The at least one alcohol is selected from the group consisting of 3,5,5-trimethylhexanol, 3-isobutyl-5,5-dimethylhexanol, 3-isopropyl-5,5-dimethylhexanol, 3-propyl-5,5-dimethylhexanol, 3-ethyl-5,5-dimethylhexanol, more 3,5,5-trimethylhexanol.

In one or more embodiments, a thickener is present. Suitable thickeners are inorganic thickeners from the group of the phyllosilicates. Besides the inorganic thickeners, however, it is also possible to use one or more organic thickeners. In one or more embodiments, these organic thickeners are selected from the group consisting of (meth) acrylic acid-(meth)acrylate copolymer thickeners, such as, for example, the commercial product Viscalex HV30 (Ciba, BASF), and polyurethane thickeners, such as, for example, the commercial product DSX® 1550 from Cognis. (Meth) acrylic acid-(meth)acrylate copolymer thickeners are those which as well as acrylic acid and/or methacrylic acid also include in copolymerized form one or more acrylic esters (in other words acrylates) and/or one or more methacrylic esters (in other words methacrylates). A feature common to the (meth)acrylic acid-(meth)acrylate copolymer thickeners is that in an alkaline medium, in other words at pH levels >7, more particularly >7.5, they exhibit a sharp increase in viscosity as a result of salt formation by the acrylic acid and/or methacrylic acid, in other words as a result of the formation of carboxylate groups. Where (meth)acrylic esters are used that are formed from (meth)acrylic acid and a $C_1$-$C_6$ alkanol, the products are essentially nonassociative (meth) acrylic acid-(meth)acrylate copolymer thickeners, such as the aforementioned Viscalex HV30, for example. Substantially nonassociative (meth)acrylic acid-(meth)acrylate copolymer thickeners are also referred to in the literature as ASE thickeners ("alkali soluble/swellable emulsion" or dispersion). As (meth)acrylic acid-(meth)acrylate copolymer thickeners it is also possible, however, to use what are called HASE thickeners ("hydrophobically modified anionic soluble emulsions" or dispersions). These are obtained if the alkanol used, instead of or in addition to the $C_1$-$C_6$ alkanols, comprises alkanols having a greater number of carbon atoms, such as 7 to 30, for example, or 8 to 20 carbon atoms. HASE thickeners are substantially associative in their thickening effect. On account of their thickening properties, the (meth)acrylic acid-(meth)acrylate copolymer thickeners that can be used are not suitable as binder resins, and are therefore not included in the binders that are curable physically, thermally or both thermally and actinically and are identified as binders, and they are therefore explicitly different from the poly(meth)acrylate-based binders which can be used in the basecoat compositions compositions of the invention. Polyurethane thickeners are the associative thickeners that are referred to in the literature as HEUR ("hydrophobically modified ethylene oxide urethane rheology modifiers"). In chemical terms they are nonionic branched or nonbranched block copolymers of polyethylene oxide chains (sometimes also polypropylene oxide chains) which are linked to one another via urethane bonds and which carry terminal long-chain alkyl or alkylene groups having 8 to 30 carbon atoms. Typical alkyl groups are, for example, dodecyl or stearyl groups; a typical alkenyl group is, for example, an oleyl group; a typical aryl group is the phenyl group; and a typical alkylated aryl group is, for example, a nonylphenyl group. The polyurethane thickeners, on account of their thickening properties and structure, are not suitable as binder resins curable physically, thermally or both thermally and physically. They are therefore explicitly different from the polyurethanes which can be used as binders in the basecoat compositions of the invention.

In one or more embodiments, the pigmented aqueous basecoat material to be used further comprises at least one polyester, more particularly a polyester having a number-average molecular weight of 400 to 5000 g/mol (measured by means of gel permeation chromatography against a polystyrene standard; tetrahydrofuran is used as eluent). Corresponding polyesters are described in DE 4009858 in column 6, line 53 to column 7, line 61 and column 10, line 24 to column 13, line 3.

The pigmented aqueous basecoat material may also, furthermore, comprise at least one additive. Examples of such additives are salts which can be decomposed thermally without residue or substantially without residue, resins which are curable physically, thermally and/or with actinic radiation and are different from polyurethane resins, as binders, further crosslinking agents, organic solvents, reactive diluents, transparent pigments, fillers, molecularly dispersely soluble dyes, nanoparticles, light stabilizers, antioxidants, deaerating agents, emulsifiers, slip additives, polymerization inhibitors, free radical polymerization initiators, adhesion promoters, flow control agents, film-forming assistants, sag control agents (SCAs), flame retardants, corrosion inhibitors, waxes, siccatives, biocides, and matting agents.

Suitable additives of the aforementioned kind are known for example from
German patent application DE 199 48 004 A1, page 14, line 4, to page 17, line 5,
German patent DE 100 43 405 Cl, column 5, paragraphs [0031] to [0033].
They are used in the customary and known amounts.

The solids content of the basecoat materials used in accordance with the invention may vary according to the requirements of the individual case. First and foremost the solids content is guided by the viscosity that is required for application, more particularly spray application, and so it may be set by the skilled person on the basis of his or her general art knowledge, with the assistance where appropriate of a few rangefinding tests.

In one or more embodiments, the solids content of the basecoat materials is 5% to 70%, more particularly 10% to 65%, and very particularly 15% to 60%, by weight.

By solids content is meant that weight fraction which remains as a residue when evaporated under defined conditions. In the present specification, the solids has been determined in accordance with DIN EN ISO 3251. The measuring time was 60 minutes at 125° C.

The basecoat materials used in accordance with the invention can be prepared using the mixing methods and mixing assemblies that are customary and known for producing basecoat materials.

The basecoat materials in accordance with the invention may be employed as one-component (1K), two-component (2K) or multicomponent (3K, 4K) systems. In one or more embodiments, the basecoat materials are employed as (1K) systems.

In one-component (1K) systems, binder and crosslinking agent are present alongside one another, i.e. in one component. A prerequisite for this is that the two constituents crosslink with one another only at relatively high temperatures and/or on exposure to actinic radiation.

In two-component (2K) systems, for example, binder and crosslinking agent are present separately from one another in at least two components, which are not combined until shortly before application. This form is selected when binder and crosslinking agent react with one another even at room temperature. Coating materials of this kind are employed in particular for coating thermally sensitive substrates, especially in automotive refinish.

The application of the pigmented aqueous basecoat material used in accordance with the invention to a substrate may take place in the film thicknesses that are customary in the context of the automobile industry, in the range from, for example, 5 to 100 micrometers, particularly 5 to 60 micrometers. This is done employing, for example, the known techniques such as spraying, knife coating, brushing, pouring, dipping, impregnating, trickling or rolling. In one or more embodiments spray application methods, such as, for example, compressed air spraying, airless spraying, high speed rotation, or electrostatic spray application (ESTA), alone or in conjunction with hot spray application such as hot air spraying, for example are employed.

After the pigmented aqueous basecoat material has been applied, it may be dried by known techniques. For example, 1K basecoat materials may be flashed at room temperature for 1 to 60 minutes and subsequently dried at optionally slightly elevated temperatures of 30 to 80° C. Flashing and drying for the purposes of the present invention mean the evaporation of organic solvents and/or water, whereby the coating material becomes drier, but is not yet cured, or there is as yet no formation of a fully crosslinked coating film.

A commercially customary clearcoat material is then applied likewise by common techniques, the film thicknesses again being situated within the customary ranges, such as 5 to 100 micrometers, for example. Clearcoat materials of this kind are known to the skilled person.

Following the application of the clearcoat material, it may be flashed at room temperature for 1 to 60 minutes, for example, and optionally dried. The clearcoat material is then cured together with the pigmented basecoat material applied. Here, for example, crosslinking reactions take place, to produce a multicoat color and/or effect paint system of the invention on a substrate. In one or more embodiments, curing takes place thermally or both thermally and with actinic radiation, at temperatures from 80 to 200° C.

With the aid of the method of the invention it is possible to coat metallic and nonmetallic substrates, especially plastics substrates, particularly automobile bodies or parts thereof.

The invention also provides the corresponding coating materials and the use of the alcohol or mixtures of alcohols employed in the basecoat materials of the invention for the purpose of increasing the pinholing limit and/or for the purpose of reducing the number of pinholes in aqueous pigmented coatings. All features identified above in relation to the method of the invention likewise relate to the corresponding coating materials and to the use of the alcohol or mixtures of alcohols employed in the basecoat materials of the invention for the purpose of increasing the pinholing limit and/or for the purpose of reducing the number of pinholes in aqueous pigmented coatings. This applies also, in particular, to all specified preferred, more preferred, and very preferred features.

The invention is elucidated below with reference to examples.

EXAMPLES

1. Preparation of a Silver Aqueous Basecoat Material 1

The components listed in Table 1 under "aqueous phase" are stirred together in the order stated to form an aqueous mixture. In the next step, an organic mixture is prepared from the components listed under "organic phase". The organic mixture is added to the aqueous mixture. The resulting mixture is then stirred for 10 minutes and adjusted using deionized water and dimethanolamine to a pH of 8 and a spray viscosity of 58 mPas under a shearing load of 1000/sec, measured using a rotational viscometer (Rheomat RM 180 instrument from Mettler-Toledo) at 23° C.

TABLE A

| Component | Parts by weight |
|---|---|
| Aqueous phase | |
| 3% strength Na Mg phyllosilicate solution | 26 |
| Deionized water | 3 |
| Butyl glycol | 1.75 |
| Polyurethane acrylate; prepared as per page 7, line 55-page 8, line 23 of DE-A-4437535 | 4.5 |
| 50% strength by weight solution of DSX 1550 (Cognis), rheological agent | 0.6 |
| Polyester; prepared as per example D, column 16, lines 37-59 of DE-A-4009858 | 3.2 |
| Tensid S (BASF); surfactant | 0.3 |
| Butyl glycol | 0.55 |
| Cymel 203; melamine-formaldehyde resin, available from Cytec | 4.1 |
| 10% strength dimethylethanolamine in water | 0.3 |
| Deionized water | 6 |
| Polyurethane acrylate; prepared as per page 19, line 44-page 20, line 21 of DE-A-19948004 | 20.4 |
| Tensid Surfynol ® 104 surfactant from Air Products (52% form) | 1.6 |
| Butyl glycol | 0.5 |
| 3% strength by weight aqueous solution of Viscalex HV 30; rheological agent, available from BASF, in water | 3.9 |
| Organic phase | |
| Mixture of two commercial aluminum pigments, available from Altana-Eckart | 6.2 |

TABLE A-continued

| Component | Parts by weight |
|---|---|
| Butyl glycol | 7.5 |
| Polyester; prepared as per example D, column 16, lines 37-59 of DE-A-4009858 | 5 |

Waterborne Basecoat Material I1:

To prepare the inventive waterborne basecoat material IL the waterborne basecoat material 1 was admixed with 1.5 parts by weight of commercial 3,5,5-trimethylhexanol.

TABLE 1

Compositions of the waterborne basecoat materials 1 and I1

| WBM | [% by weight] | Alcohol |
|---|---|---|
| 1 | — | — |
| I1 | 1.5 | 3,5,5-trimethylhexanol |

The weight percentages in Table 1 relate to the fraction of the alcohol in the respective waterborne basecoat material.

Comparative Experiment between Waterborne Basecoat Material 1 and Waterborne Basecoat Material I1

For the determination of the pinholing limit and of the number of pinholes, the multicoat paint systems were produced in accordance with the following general instructions:

A steel panel with dimensions of 30×50 cm, coated with a primer-surfacer coat, was given an adhesive strip on one longitudinal edge in order to enable the differences in coat thickness to be determined after coating. The waterborne basecoat material was applied electrostatically in wedge format. The resulting waterborne basecoat film was flashed for one minute at room temperature and then dried for 10 minutes in a forced air oven at 70° C. A customary two-component clearcoat material was applied to the dry waterborne basecoat film. The resulting clearcoat film was flashed at room temperature for 20 minutes. The waterborne basecoat film and the clearcoat film were then cured in a forced air oven at 140° C. for 20 minutes. Following visual evaluation of the pinholes in the resulting wedge-shaped multilayer paint system, the film thickness of the pinholing limit was ascertained. The results are found in Table 2.

TABLE 2

Pinholing limit and number of pinholes for waterborne basecoat material 1 and waterborne basecoat material I1

| WBM | Pinholing limit (micrometers) | Number of pinholes |
|---|---|---|
| 1 | 14 | 20 |
| I1 | 21 | 2 |

The results emphasize the fact that the use of the alcohols of the invention increases the pinholing limit in comparison to waterborne basecoat material 1, and at the same time reduces the number of pinholes.

What is claimed is:

1. A method for producing a multicoat color and/or effect paint system, the method comprising
   (1) applying to a substrate a pigmented aqueous basecoat material,
   (2) forming a polymer film from the basecoat material applied in stage (1),
   (3) applying a clearcoat material to the resultant polymer film, and then
   (4) curing the polymer film together with the clearcoat film,
   characterized in that in stage (1) wherein the pigmented aqueous basecoat material comprises at least one alcohol in an amount of 0.1% to 5% by weight, based on the total weight of the aqueous basecoat material, the at least one alcohol having a structure:

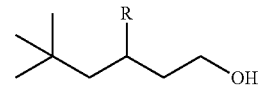

wherein R is a $C_1$ to $C_4$ alkyl radical, with the proviso that R is not an n-butyl radical.

2. The method of claim 1, wherein R is a $C_1$ to $C_3$ alkyl radical.

3. The method of claim 1, wherein R is a methyl radical.

4. The method of claim 1, wherein the at least one alcohol is selected from the group consisting of 3,5,5-trimethylhexanol, 3-isobutyl-5,5-dimethylhexanol, 3-isopropyl-5,5-dimethylhexanol, 3-propyl-5,5-dimethylhexanol, 3-ethyl-5,5-dimethylhexanol.

5. The method of claim 1, wherein the amount of the at least one alcohol is 0.1% to 4.5% by weight, based on the total weight of the aqueous basecoat material.

6. The method of claim 1, wherein the amount of the at least one alcohol is 0.2% to 4% by weight, based on the total weight of the basecoat material.

7. The method of claim 1, wherein the pigmented aqueous basecoat material comprises as binder at least one saturated or unsaturated polyurethane resin.

8. The method of claim 1, wherein the pigmented aqueous basecoat material comprises at least one crosslinking agent selected from the group consisting of amino resins and blocked or nonblocked polyisocyanates.

9. The method of claim 1, wherein the pigmented aqueous basecoat material comprises at least one crosslinking agent comprising a melamine resin.

* * * * *